(12) United States Patent
Wright et al.

(10) Patent No.: US 6,621,801 B1
(45) Date of Patent: Sep. 16, 2003

(54) DISTRIBUTED CONTROL DAMA PROTOCOL FOR USE WITH A PROCESSING COMMUNICATIONS SATELLITE

(75) Inventors: David A. Wright, Solana Beach, CA (US); Jaime L. Prieto, Torrance, CA (US); Scott L. Wilkinson, Manhattan Beach, CA (US)

(73) Assignee: Northrop Grumman Corporation, Redondo Beach, CA (US)

( * ) Notice: Subject to any disclaimer, the term of this patent is extended or adjusted under 35 U.S.C. 154(b) by 0 days.

(21) Appl. No.: 09/162,514

(22) Filed: Sep. 29, 1998

(51) Int. Cl.[7] .......................... H04B 7/204; H04B 7/212
(52) U.S. Cl. ....................... 370/319; 370/347
(58) Field of Search ................. 370/277–278, 370/282, 319, 321–323, 443, 444, 447, 341, 347, 348, 458; 455/12.1, 13.2, 427, 430

(56) References Cited

U.S. PATENT DOCUMENTS

| | | | | |
|---|---|---|---|---|
| 5,003,534 A | * | 3/1991 | Gerhardt et al. | 370/94.1 |
| 5,197,125 A | | 3/1993 | Engel et al. | |
| 5,392,450 A | * | 2/1995 | Nossen | 455/12.1 |
| 5,640,395 A | * | 6/1997 | Hamalainen et al. | 370/322 |
| 5,699,346 A | * | 12/1997 | VanDervort | 370/233 |
| 5,729,541 A | * | 3/1998 | Hamalainen et al. | 370/337 |
| 6,240,083 B1 | * | 5/2001 | Wright et al. | 370/348 |
| 6,377,561 B1 | * | 4/2002 | Black et al. | 370/330 |

FOREIGN PATENT DOCUMENTS

| | | |
|---|---|---|
| EP | 0213640 | 3/1987 |
| EP | 0722228 | 7/1996 |
| GB | 2320162 | 6/1998 |

OTHER PUBLICATIONS

Irwin Mark Jacobs et al., "General Purpose Packet Satellite Networks," Proceedings of the IEEE, vol. 66, No. 11, Nov. 1978, pps. 1448–1467.

* cited by examiner

Primary Examiner—Alpus H. Hsu
Assistant Examiner—Toan Nguyen
(74) Attorney, Agent, or Firm—John A. Miller; Warn, Burgess & Hoffman, P.C.

(57) ABSTRACT

A distributed demand assigned multiple access control scheme for use in connection with a processing satellite communications system, where multiple users are assigned to a common transmission resource as part of a sharing set. The control scheme of the invention makes use of a reservation procedure by transmitting set addressed reservation messages in a contentious control flow to reserve data transfer time in a non-contentious main flow. Each user of the sharing set is synchronized to the next available uplink time slot available to transmit data in the main flow. If a transmitted reservation message is returned in the satellite downlink, the terminal knows that all of the users of the set received the message. That reserved time interval in the main flow Is now owned by that user, and each user in the shared set updates its next available uplink time slot based on the reserved time.

27 Claims, 4 Drawing Sheets

DISTRIBUTED CONTROL DAMA PROTOCOL FOR USE WITH A PROCESSING COMMUNICATIONS SATELLITE

BACKGROUND OF THE INVENTION

1. Field of the Invention

This invention relates generally to a demand assigned multiple access protocol for use in a satellite communications system and, more particularly, to a distributed control demand assigned multiple access protocol for use in connection with a processing satellite communications system to allow multiple users to efficiently use a common uplink transmission resource (TR).

2. Discussion of the Related Art

Various communication systems make use of a processing satellite orbiting the Earth in a geosynchronous orbit. As is known in the art, processing satellites provide the transfer of data between user terminals at ground stations on the Earth. Data is transmitted to the satellite from the user terminals on a satellite uplink. The uplink signals are transmitted on channel slots that are separated in frequency and time. The data that is transmitted on the channel slots is separated or packaged into separate ATM (asynchronous transfer mode) data transfer cells. The ATM cells are demodulated, decoded and switched at the processing satellite, and then transmitted back to the Earth on a satellite downlink. A suitable antenna system is provided on the satellite to receive the uplink signals and transmit the downlink signals over a predetermined coverage area on the Earth.

A common problem for processing communications satellite system is the need to regulate access to the satellite for a multitude of bursty users, for example, a set of intra-corporate inter-site local area network (LAN) interconnections, who mutually share the uplink. In other words, some form of protocol is required to allow the many users to gain access to the satellite on the uplink without interfering with each other. Typically, bursty users require a high peak transmission rate to minimize response time, but have a low duty cycle. If a dedicated uplink TR were allocated to each user at the peak rate, then the average usage of the TR would be low because of the low duty cycle. A TR is defined to be a group of channel slots available for transmitting data on a transmission uplink path at a certain bandwidth.

To solve the above-described problem, demand assigned multiple access (DAMA) protocols have been designed to improve the usage efficiency of the available TRs by allowing several users to share the same uplink TR. In other words, to provide a more efficient use of the available TRs, multiple users share the same uplink bandwidth. In general, DAMA protocols involve trading data throughput efficiency against delay. One of the first DAMA protocols is generally known as "Slotted Aloha", where the multiple users of the common TR compete for resource usage. In the past, Slotted Aloha has been used mainly on so-called "bent-pipe" satellites where the downlink is simply a frequency and power shift of the uplink and where collision detection is performed by the terrestrial users. Nevertheless, the concept applies equally to processing satellites where the uplink and downlink transmission formats may differ markedly as a result of processing (where the uplink signal is demodulated, decoded, et cetera, the resultant data content switched to the appropriate downlink and then recoded, remodulated, et cetera) except that collision detection typically also involves the processing satellite. In the Slotted Aloha technique, any of the several users of the same TR would transmit data on the uplink whenever they desired. If another user of the same resource also transmitted data at the same time, the two uplink signals would collide at the satellite, resulting in a downlink signal that was unusable. If the user that transmitted the data received the downlink signal in this unusable format, it would know that there was a collision with another user, and would then retransmit the data at a later time. In order to prevent subsequent immediate collisions by the same two users, the delay of the retransmission for each user was randomized. Although, the Slotted Aloha method does increase the usage efficiency of the TRs by statistically multiplexing the resources, there is a significant potential for collisions when multiple users simultaneously access the uplink, necessitating retransmission and concomitant delay by all of the users.

To limit the number of collisions, improved DAMA techniques were devised, generally referred to as reservation DAMAs. The article, Jacobs, Irwin Mark, et al. "General Purpose Packet Satellite Networks" Proceedings of the IEEE, Vol. 66, No. Nov. 11, 1978, pp. 1448–1467, describe approaches to reservation DAMA protocols. In a reservation DAMA protocol, the uplink traffic is separated into a main flow where coordinated non-contentious access to the uplink resource is provided through a predetermined reservation procedure, and a control flow which uses the contentious Slotted Aloha technique, but only for reservation requests. The reservation procedure is defined by specifically reserving a particular slot in the uplink TR prior to actually transmitting the desired data. By reserving particular channel slots for transmitting data on the TR, the chance of a collision between users is removed. Collisions are therefore limited to the lower rate control flow resulting in a much higher usable throughput for the main flow of data.

For processing satellites, there can be three general variations of the reservation DAMA technique, depending on where the reservations are controlled. Particularly, the reservations can be controlled at a central terrestrial location, often referred to as a Network Operations Center (NOC), on board the processing satellite itself, or distributed among the set of users using the TR which are regulated by the DAMA protocol. The first approach is useful for bent-pipe and processing satellites, and is currently in use in very small aperture terminal (VSAT) networks. However, this approach has the disadvantages that a heavy processing load to control the DAMA protocol may occur at the NOC, and two trips through the satellite are required for each reservation request, thus resulting in extra delay and increased usage of the TR. The second approach offers ease of synchronization of a new user to the TR, but has the drawback that it requires extra processing resources on the satellite.

What is needed is an uplink TR allocation technique that allows multiple bursty users to efficiently use a common uplink transmission source in an efficient manner that avoids collisions between the users, and maximizes the utilization of system resources. It is therefore an object of the present invention to provide such a technique.

SUMMARY OF THE INVENTION

In accordance with the teachings of the present invention, a distributed demand assigned multiple access control scheme is disclosed for use in connection with a processing satellite communications system, where multiple users are assigned to a common TR as part of a sharing set. The DAMA control scheme of the invention makes use of a reservation procedure that includes transmitting set addressed reservation messages in a contentious control flow to reserve data transfer time in a non-contentious main flow. Each user of the sharing set is synchronized with each other and with a known synchronization variable defined by the next available uplink time slot available to transmit data in the main flow. When a user of the sharing set wishes to send data in the main flow, it transmits a set addressed reservation message in the control flow. If the set addressed reservation message is returned in the satellite downlink, the terminal may assume that all of the users of the shared set received the message. The requesting user can compute the reserved time interval in the main flow and that time interval is now owned by that user, and each user in the shared set updates its next available uplink time slot based on this reserved time.

By gaining access to the shared set, each user is limited to a predetermined peak cell rate, sustained cell rate, and a maximum reservation length. The maximum reservation length identifies the largest number of data units transmitted per reservation, and defines a worst case delay that the user must wait to gain a reservation. A user may "piggyback" a reservation by sending a set addressed reservation message during transmission of data in the main flow.

Additional objects, advantages, and features of the present invention will become apparent from the following description and appended claims, taken in conjunction with accompanying drawings.

DETAILED DESCRIPTION OF THE PREFERRED EMBODIMENTS

The following discussion of the preferred embodiments directed to a distributed control demand assigned multiple access protocol for a processing communications systems satellite is merely exemplary in nature, and is in no way intended to limit the invention or its applications or uses.

The present invention is a reservation DAMA protocol of the type referred to above that allows multiple bursty users to concurrently use a single uplink TR in a communications system. The reservation DAMA of the invention makes use of the general variation that is distributed among the users to regulate the DAMA and the reservations. The uplink TRs are separated into a contentious control flow for reservation requests, and a reserved main flow for transmission of data. In other words, a certain number of time slots in a time multiplexed frame are used for the control flow for reservation requests, and the remaining time slots in the frame, or in frames on other channels, are used for the main flow of data.

Each user using the TR is part of a sharing set, where each user in the set competes for use of the resource. The reservation DAMA procedure, according to the invention, maintains a certain synchronization variable among the users that are using the common TR. The synchronization variable will be referred to as the next available uplink time slot (NAUTS), and is the next period of time available in the main flow of the TR for transmitting uplink data. The next available uplink time slot in the main flow may be the current uplink time slot, or a future uplink time slot depending on how many slots are currently reserved. The DAMA procedure of the invention also uses set addressed reservation messages (SARMs) that are bids by a user on the contentious control flow to reserve the next available uplink time slot in the main flow to transmit data on the uplink resource. In other words, each user must transmit a SARM in the control flow to get a non-contentious reservation in the main flow to transmit its data.

Broadcast of the SARM is contentious to all of the users of the sharing set in that the control flow of the SARM is not reserved, but once the time slot is reserved in the main flow, transmission of the data is reserved. Since the SARMs sent in the control flow by all of the users of the sharing set use a contentious access, the standard techniques of the known Slotted Aloha process applies to the users, including collision detection (inferred by time-out) and a random retransmission strategy. A user sending a SARM in the control flow can detect collisions by the absence within a certain time window of the expected SARM in the downlink. Note that processing satellites typically use robust error control on their uplink which would reject colliding SARMs.

The SARMs used to request a reservation in the main flow would include the length $S_{res}$ of the requested reservation. When a user of the sharing set observes a SARM in the downlink, it updates the NAUTS to the current NAUTS plus the newly reserved interval in the SARM. The user which sent the SARM has reserved the interval from the current next available time slot up to the new NAUTS for its exclusive access to the main flow on the uplink TR. The NAUTS may be the current uplink time slot when no SARM has been transmitted for a period of time. This situation will arise when no user has reserved access to the current time slot. The largest reservation interval that may be requested can be capped to some maximum value $S_{max}$ to insure fairness among the users in the sharing set and to provide a worst case waiting or delay time for transmitting data for each user.

In addition to the length $S_{res}$ of the reservation interval that is bid for, a SARM also contains the NAUTS that applied when the SARM was sent in the uplink, and the uplink time slot in which the SARM was sent. Assuming that a user terminal has acquired synchronization with the rest of the sharing set in that it currently has the correct NAUTS, it can then maintain synchronization to the set by following a procedure for identifying the current uplink time slot (CUTS). If the user has received one or more SARMs during a previous CUTS, then the previous NAUTS is updated to account for all the reserved slots identified in the received SARMs. If no SARM was received during the preceding CUTS, then if the NAUTS is greater than the CUTS in the future, it is left unchanged. However, if the NAUTS and the CUTS are equal, then the NAUTS is incremented by one, i.e., the CUTS elapses unused by any member of the sharing set.

To initiate a network or resource access, a prospective user requests the NOC to assign it to a sharing set of a particular class. The NOC performs "connection admission control" to determine whether the connection requested by the user may be granted. Each sharing set class is identified by certain parameters, including a peak cell rate (PCR), a sustained cell rate (SCR), and a maximum reservation length $S_{max}$. Different sharing sets will have different parameter variations to accommodate the different types of users using the satellite. In certain hybrid systems, the different users of a single sharing set may have different parameter variations. The PCR is the largest available transfer rate of data during a particular reservation, and is defined by the bandwidth of the channel being used. The SCR is the minimum capacity guaranteed to each user. The SCR is defined as SCR≦PCR/ $NU_{max}$, where $NU_{max}$ is the maximum number of users that are allowed in a sharing set. The maximum reservation length $S_{max}$ identifies the largest number of data units (typically a set of four ATM cells) per reservation, and defines a worst case delay $S_{wcd}$ that the user must wait to gain a reservation.

If a sharing set of the given class exists, and if there are less than $NU_{max}$ active users assigned to the sharing set, then the requesting user may be admitted. If no sharing set of the requested class can accept the requesting user, then the NOC may open a new sharing set of the specified class, and assign the new user as a first user thereto. Alternatively, the NOC may suggest that the requesting user reapply to a sharing set using a different class, or the NOC may deny the admission request outright. When admission to the sharing set is granted, a "traffic contract" is provided. That is, an admitted user to a sharing set is guaranteed access to the uplink at a burst rate equal to the PCR and with an average access rate of at least the SCR.

A user that has a reservation is required to refrain from making additional reservations until the existing reservation has been expended. The maximum number of uplink time slots that a user must wait from the time that it bids for a reservation until an uplink slot is available is determined by $S_{wcd}=S_{max}*(NU_{max}-1)+S_{rt}$, where $S_{rt}$ is the round trip time in units of time slots that the SARM travels on the uplink, is processed by the satellite, and is received by the user on the downlink. There is a possibility of a collision in the control flow, which may introduce additional delay. However, it is unlikely that a user will ever experience a delay exceeding $S_{wcd}$, since the probability that all $NU_{max}$ users in the sharing set requesting access concurrently is quite small, when $NU_{max}$ is large. Conversely, when $NU_{max}$ is small, $S_{wcd}$ also tends to be small.

Before a user can be part of the sharing set to use the common TR, that user must become synchronized with the reservation status of the sharing set as a whole. Once synchronized, the user will then know the next available uplink time slot to transmit data in the main flow, will be free to bid for reserved time slots using SARMs, can monitor the downlink traffic for the presence of SARMs of its own or the other users of the set, and will be able to update to the NAUTS when a SARM is received. A newly joining user to a sharing set can obtain synchronization when it first observes a SARM in the downlink, after having monitored all SARMs (if any) in the downlink for at least a round trip time beforehand. Upon observing this "trigger" SARM, the joining terminal knows the NAUTS that prevailed at the time the trigger SARM was launched and also knows all additional reservation requests that have arrived in the downlink since the trigger SARM was launched. Therefore, the joining terminal can evolve the NAUTS in the trigger SARM to the current value of NAUTS using the procedures shown in FIG. 4 and described in the supporting narrative.

In the event that a newly joining user does not see a SARM in the downlink for an extended period of time, it may validly conclude that no reservations are outstanding. In this situation, the NAUTS may be set to the CUTS, and the user will have attained synchronization. A sufficient interval for attaining synchronization without observing a SARM is $S_{wcd}$ as defined above.

If, at any time, a terminal detects that one or more cells in its downlink are unusable, then the terminal must discard such cells, make the assumption that the cells represent one or more SARMs that it missed, revert to the unsynchronized state, and reacquire synchronization, using the procedure described in the preceding paragraph.

For certain processing satellite systems, some of the payload for the final time slot in a reservation in the main flow may be unused. In this situation, a user may "piggyback" its next reservation request by sending a SARM in the final time slot using the main flow rather than the control flow. An example of this situation would be where each transmission unit is comprised of multiple ATM cells and where a SARM is contained within a single cell. Similarly, when a user is sending traffic with a total length less than the maximum reservation $S_{max}$, it routinely uses the final slot of a reservation to send a SARM for a continuation. This approach insures that the SARM will not experience a collision and off-loads the control flow, thereby reducing the opportunity for collisions for other users. Other SARMs must be sent in the control flow.

Figure 1:
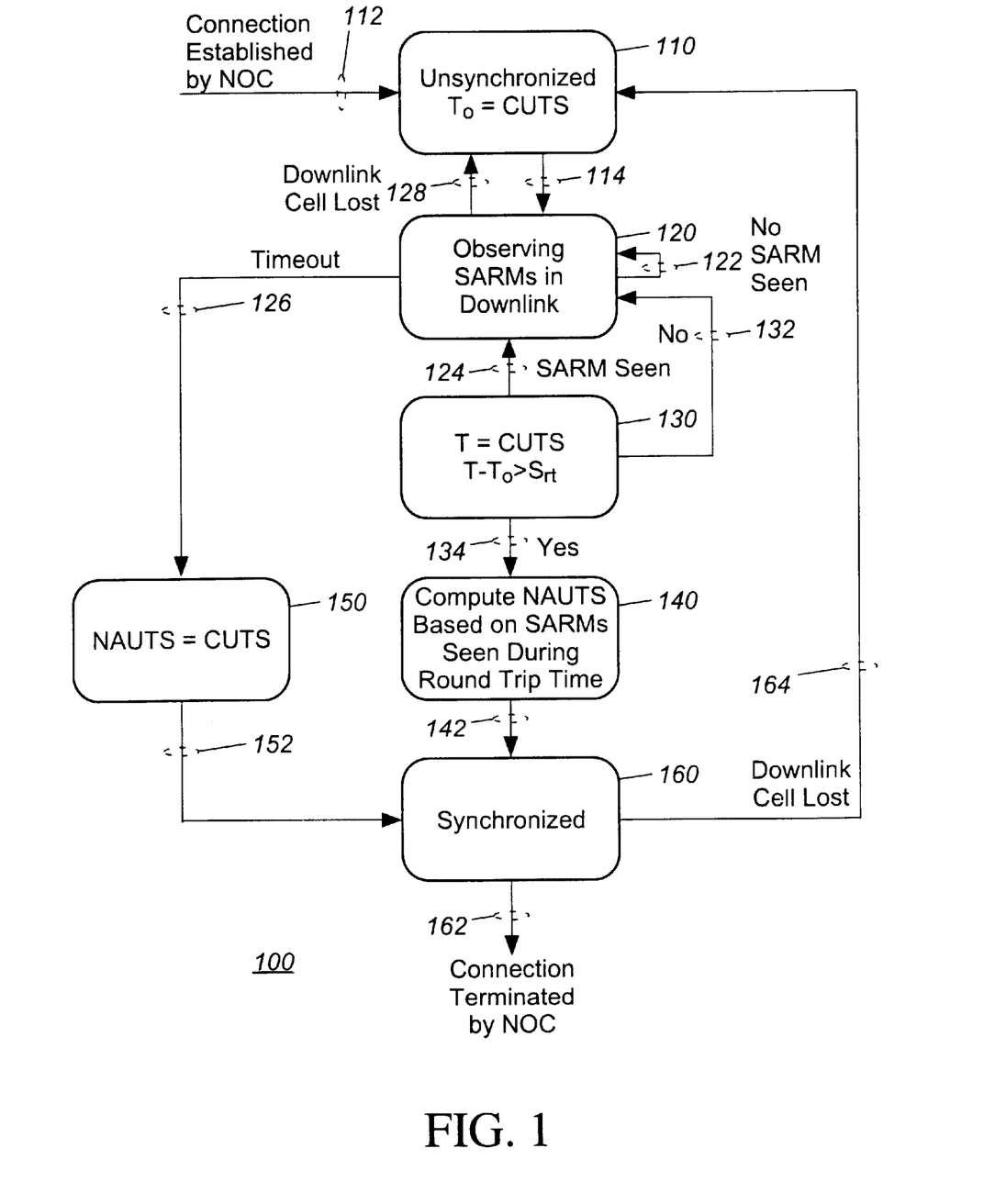
FIG. 1 is a state diagram depicting synchronization of a single user with a set of already mutually synchronized other users who share the TR, according to a demand assigned multiple access technique of the invention.

FIG. 1 shows a state diagram 100 for the process of initial and continuing reservation synchronization by a user with the other members of the sharing set (if any). After completing the Connection Admission process with the NOC, as described above, the user is apprised of the cell address used by the sharing set for SARMs and enters 112 the unsynchronized state 110. After noting the current uplink time slot $T_0$, the process proceeds 114 to state box 120 where the downlink is scrutinized for the presence of SARMs from other users of the sharing set.

During each uplink time slot, one of four outcomes may occur at block 120. If no SARM is seen and time out 126 has not been reached, then the process continues 122 to dwell in state 120 and search further for SARMs. If a SARM is observed in the downlink 124, the process advances to block 130 where the number of elapsed uplink time slots since state 120 was entered via 114 is compared against the round trip time in slots $S_{rt}$. If the period over which SARMs have been observed is less than $S_{rt}$ then state 120 is reentered 132 and the scrutiny of downlink SARMs continues. If, however, the period of observation exceeds the round trip time then sufficient information is available to attain synchronization and the process proceeds 134 to make the requisite computations at block 140. Upon entering the computation block 140, the user terminal has the NAUTS from the last seen SARM at 120. This value of NAUTS, which prevailed among the sharing set $S_{rt}$ epochs in the past, has been updated at all other terminals by all other SARMs (if any) seen in the downlink during the past $S_{rt}$ epochs to reach a current, commonly known, value of NAUTS at each member of the sharing set. Since the same information used by the other members of the set is now available to the synchronizing terminal, it can determine the current NAUTS and so does at block 140, following which it enters 142 the synchronized state 160. A third exit 126 from block 120 may occur if a predetermined time period elapses when no SARMs are received. This predetermined time period represents the maximum delay, $S_{wcd}$, and, from the absence of SARMs for this period, it may be inferred that no time slots have been reserved, in which case the process proceeds to block 150 where NAUTS is set to CUTS and the synchronized state 160 is entered directly via 152. A third exit 126 from block 120 may occur if a predetermined time period elapses when no SARMs are received. This predetermined time period represents the maximum delay, $S_{wcd}$, and, from the absence of SARMs for this period, it may be inferred that no time slots have been reserved, in which case the process proceeds to block 150 where NAUTS is set to CUTS and the synchronized state 160 is entered directly via 152.

The fourth outcome 128 at block 120 relates to the rare, but possible, event that the processes' view of the downlink becomes obscured by the loss of one or more cells during a time slot. In this event, the process may have missed a SARM and thus no longer would be able to reliably predict NAUTS at blocks 140 or 150. To forestall the possibility that the terminal falsely declares itself to be in reservation synchronization, the process deliberately reenters 128 the unsynchronized block 110 and starts again from the beginning. Similarly, after achieving synchronization 160, the processes' view of the downlink may become obscured by the loss of one or more cells during a time slot and this event results in transition 164 from the synchronized state to the unsynchronized block 110 where the process of resynchronization commences. For a typical processing satellite the likelihood of downlink cell loss is very low, except when the terminal is experiencing poor propagation conditions, as for example during severe rain, so that most terminals will sojourn indefinitely in the synchronized state 160 until such time as the terminal's connection is disestablished 162 by the NOC.

Figure 2:
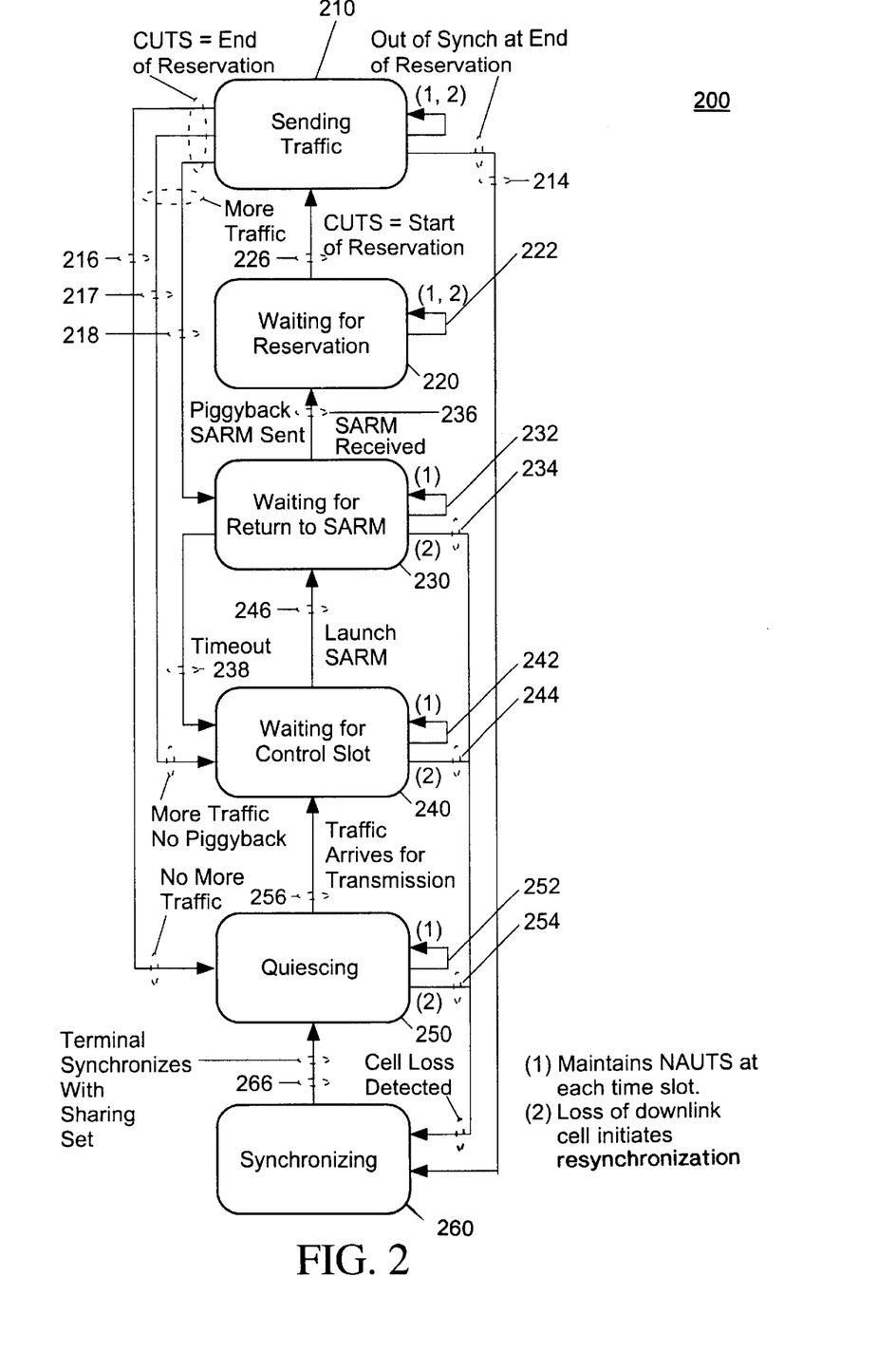
FIG. 2 is a state diagram depicting the distributed demand assigned multiple access technique according to an embodiment of the present invention.

FIG. 2 shows a state diagram 200 depicting the operation of the distributed DAMA protocol, according to the invention discussed above. So long as the terminal participating in the DAMA process is synchronized with the sharing set as a whole 266, it can then use the transmission resource to send its own SARMs in the control flow and to validly conclude, upon reception of its own SARM, the applicable NAUTS at which its reservation is effective.

A synchronized terminal is required to monitor its downlink, at all times, for the presence of SARMs, sent from members of the sharing set, including possibly itself, to maintain this synchronization as indicated at the state holding loops 212, 222, 232, 242, 252. At each time slot, the terminal is required to update its value of NAUTs, as described in the narrative for FIG. 4. This background process is assumed to be ongoing during all states depicted in FIG. 2 as noted in (1) thereto.

Loss of one or more cells in the downlink is a rare but detectable event for terminals of a processing satellite system of the type considered for this invention. Even though the loss of a cell may not result in the loss of a SARM, nevertheless, in the event that loss of any cell is detected, the terminal is required to infer that it may have lost a SARM and thus can no longer reliably predict NAUTS in concert with the other members of the sharing set. In this event, the terminal is required to revert to the unsynchronized state 110 of FIG. 1 as noted in (2) of FIG. 2 and indicated at exits 234, 244, 254 from states 230, 240, 250 respectively to state 260. Moreover, if the DAMA process at the terminal is not waiting for 220 or using 210 a previously established reservation when loss of a cell is detected, the process of resynchronization is initiated forthwith, however, said loss notwithstanding, the previously established reservation is allowed to go to completion at block 210. If the process is not in the synchronized state when the data transfer 210 of a reservation is completed, then the process transfers 214 to the synchronizing state 260 upon exit from state 210. Upon regaining synchronization, the process advances 266 to the quiescing state 250.

State box 250 depicts a quiescing state where the user terminal is waiting for the user to indicate that it has new data transfer and, thus, requires a reservation in the main flow. The DAMA protocol then advances 256 to and waits at block 240 for the next slot in the control flow of the transmission resource to send a SARM to reserve the main flow. The DAMA protocol knows the size $S_{res}$, in time slots, of the reservation to be requested and forms a SARM containing, as a minimum, $S_{res}$, NAUTS at the time the SARM is launched, and the terminal's identity.

The user terminal transmits 246 the SARM when CUTS advances to the control slot epoch and then waits for the return of the SARM in the downlink, as indicated by state box 230. In other words, each user must transmit a SARM in the control flow to get a non-contentious reservation in the main flow to transmit its data. If the SARM fails to return on the downlink within a predetermined period of time 238, for example 300 ms, a collision is inferred, and the DAMA randomizes the delay and waits for the randomized delay control slot at the state box 240. This randomized delay is known in the art, and is generally referred to as back-off in the industry.

If the SARM is received 236 by the terminal in the downlink, the terminal will know that the main flow is reserved for its use beginning with the current value of NAUTS (i.e., at the time of reception of the SARM). The terminal then proceeds to wait for the first time slot in the reservation to send the data as indicated by state box 220. When the current uplink time slot corresponds to the start of the user's reservation 226, the terminal will send the data on the main flow uplink as indicated by state box 210. At the end of the reservation, a check is made to determine whether the DAMA process is still synchronized and, if not, the process proceeds 214 to state 260 to regain lock of NATUS with the sharing set. If the terminal is still synchronized, it may return 216 to the quiescing state box 250 if no more data is to be transferred at that time or, in the event that additional data transfer is required, may proceed 218 to state box 230 if the final slot of the reserved main flow was able to carry a SARM piggybacked with the data in that slot or may proceed 217 to state box 240 if piggybacking was not used and repeats the process of accessing the contentious control flow for the following SARM.

Figure 3:
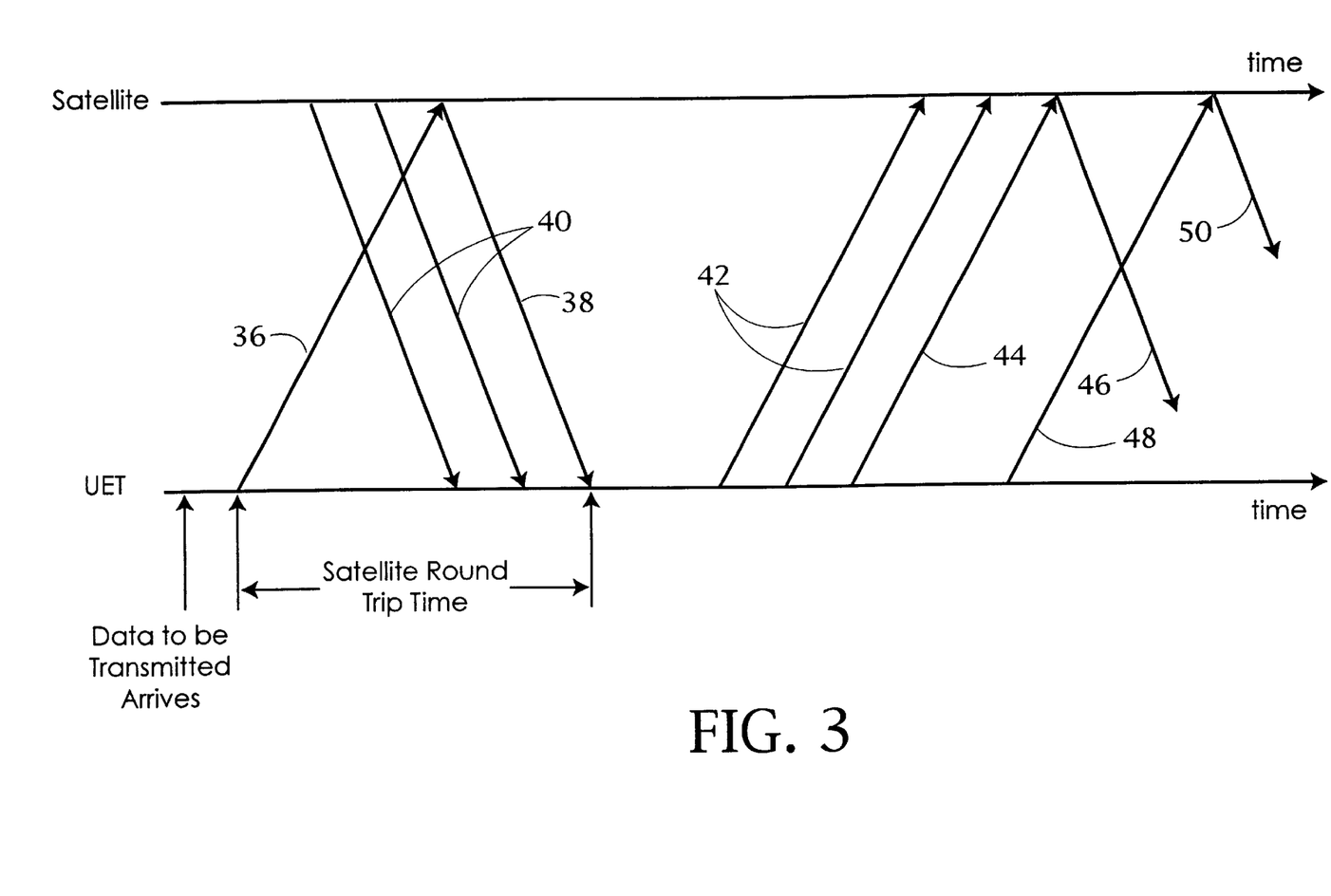
FIG. 3 is a time line depicting the operation of the distributed DAMA of the invention.

FIG. 3 shows a time line for both satellite time and the user terminal (UET) time to further depict the DAMA operation of the invention. Data is received at the user terminal at some time as indicated. Line 36 indicates a SARM sent by the terminal to reserve a time slot to transmit the data, and line 38 represents the return of the SARM received by the terminal in the downlink. Downlink lines 40 represent SARMs in the downlink from other users in the sharing set. Lines 42 represent data traffic in the main flow on the uplink from other users in the sharing set that have been reserved by the reservations in the downlink lines 40. Line 44 represents the uplink reserved transmission of the user from the SARM line 36, and line 46 represents the transmitted data on the downlink. Line 48 represents a reservation in the main flow that was piggybacked on the reservation data line 44. Line 50 represents the piggybacked SARM in the downlink.

Figure 4:
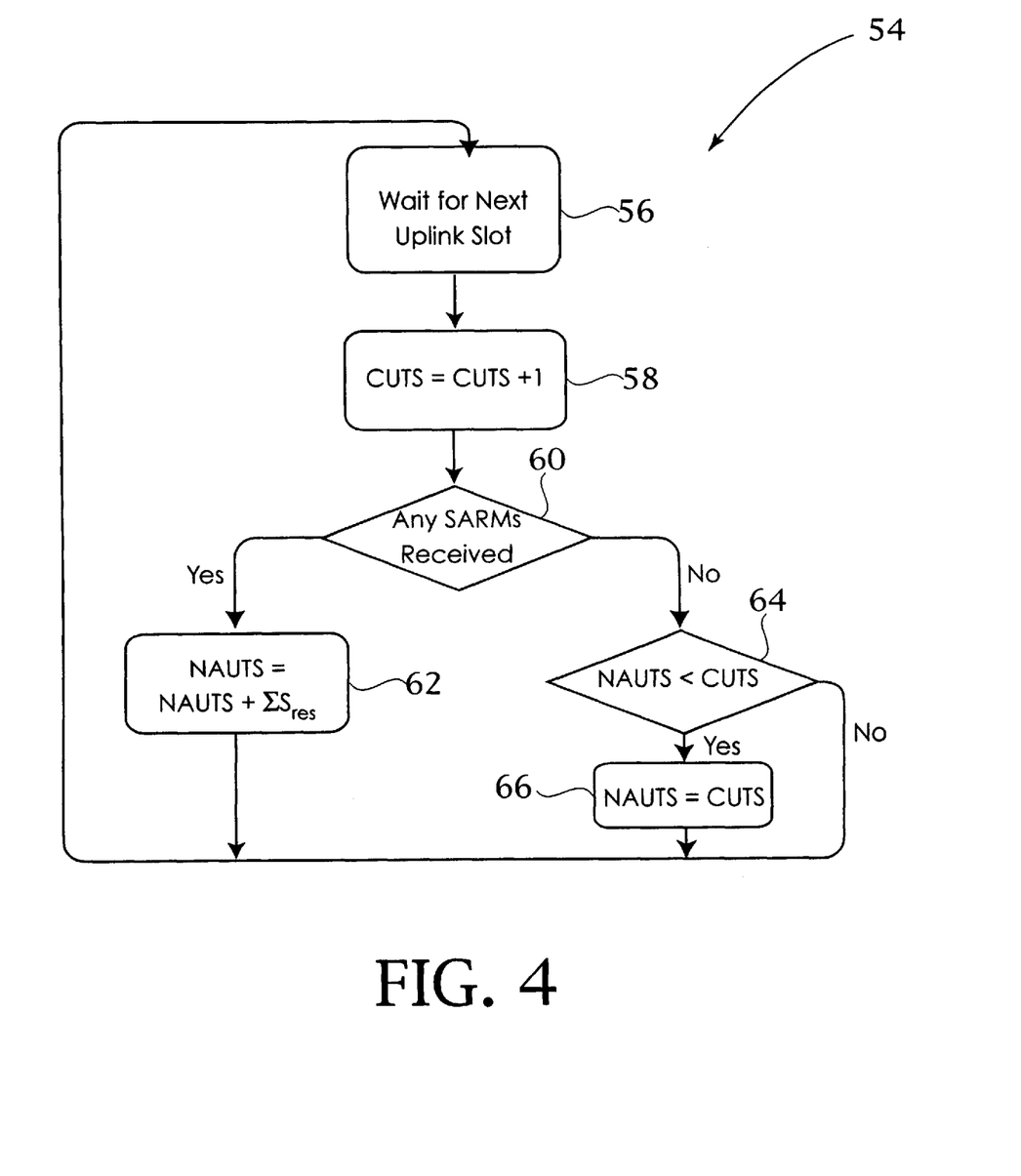
FIG. 4 is a flow diagram showing maintenance of the next available uplink time slot (NAUTS).

FIG. 4 is a flow diagram 54 showing the procedure used by the DAMA algorithm for maintaining and updating the NAUTS. In order for the reservation system of the invention to operate effectively, it is critical that each user of the sharing set know what the next available uplink time slot is to transmit data. To maintain the NAUTS, the DAMA algorithm waits for the next uplink slot, as indicated by box 56. When time advances to the next uplink slot, the algorithm sets its current uplink time slot equal to the current time slot plus one time slot to update the CUTS, as indicated by box 58. Then the algorithm determines if any SARMs have been received at decision diamond 60 that would reserve uplink time slots. If a SARM has been received, then the DAMA algorithm sets NAUTS equal to NAUTS plus the length of the reservation $S_{res}$ sent in that SARM, as indicated by box 62. The algorithm then returns to the box 56 to wait for the next uplink time slot. If a SARM is not received, the algorithm determines whether NAUTS is less than the current uplink time slot to determine if other reservations currently exist, as indicated by decision diamond 64. If NAUTS is less than CUTS, the algorithm sets NAUTS equal to CUTS as indicated by box 66, and then returns to the box 56 to wait for the next uplink slot. If NAUTS is not less than CUTS, then the algorithm returns to the box 56 to wait for the next uplink slot.

The DAMA protocol for use in connection with the processing communication satellite described above offers a number of advantages not found in the prior art DAMA protocols. Particularly, the invention offers the advantages of an efficient usage of the uplinks by the bursty users, a single hop delay for non-colliding reservation requests, piggybacking to reduce contention in the control flow, no processing at the satellite, a simple connection admission control procedure, a well defined quality of service, and is well adapted to be used with ATM protocols. Hardware currently exists in the art to perform the DAMA protocol of the invention.

Based on the discussion above, a following specific example is given. In this example, it will be assumed that the control flow and the main flow use a disjoined, non-interchangeable portions of the uplink time frame. Alternately, the SARMs may be sent within the portion of the frame used by the main flow whenever a time slot in the main flow is not reserved. This enhancement further reduces the level of contention in the control flow and, hence, the likelihood of collisions in the control flow.

In this example, assume that the uplink parameters for the processing satellite include a single channel peak rate of 384 kb/s, organized as 24*16 kb/s through use of a 24 slot TDMA frame with a period of 96 ms, where each time slot is 4 ms, and each slot includes 192 bytes in four cells, each cell being 48 bytes. One of the 24 time slots is used for the contentious control flow, and the remaining 23 time slots are used for the reserved main flow. The net flow capacities are, then, 16 kb/s for the control flow and 368 kb/s for the main flow. The sharing set class is defined by a PCR of 368 kb/s, an SCR of 70 kb/s, and a limit of 1000 time slots (192,000 bytes) as the largest reservation. The maximum number of users that can be in the sharing set Is $NU_{max}=INT[368/70]=5$. The nominal worst case delay is $S_{wcd}=4063$ (5−1)*1000+ 63, where 63 is $S_{rt}$, the approximate round time delay in time slots, or about 16.25 seconds.

For this example, the users have a mean packet size of 100 kilobytes (800 kilobits) with an average arrival rate of one packet per 12.5 seconds per user. Thus, the SARM rate for the sharing set as a whole is one per 12.5/5=2.5 seconds or 0.4 per second, when a sharing set includes the maximum of 5 members. Since there are approximately 10 control slots per second (1/0.096), the net load for the control flow is about 4 percent, which is satisfactory for slotted Aloha. The average load for each user is 800 k/12.5 or 64,000 bits per second, somewhat less than the SCR of 70 kb/s.

Suppose a user that currently does not have a reservation desires to send a mean size packet that occupies 521 (100,000/192) time slots. The user prepares a SARM reserving 521 slots, waits for the control slot in its uplink, launches the SARM, and waits for its return in the downlink. During this wait, the user updates the NAUTS as time passes and/or SARMs from other users are observed. If the SARM does not appear in the downlink within the expectation window (240–300 milliseconds, typically), the requesting user infers that the SARM collided with a SARM from another user and retransmits the SARM after waiting for a randomized intervals.

If the SARM is observed in the downlink, each user, including the user that reserved the slot, updates its NAUTS by 521 slots to reflect the new reservation. Additionally, the requesting user notes the time slot at which its reservation becomes effective, i.e., the value of NAUTS upon receipt of the SARM, waits until this time slot occurs, and then begins access via repeated cycles of the 23 main flow slots until its reservation of 521 slots has been exhausted. The 521 slots provides 100,032 bytes (521*192), so the final time slot has 32 unused bytes. Since this number is less than the assumed cell body size of 48 bytes, there is insufficient space in the final time slot for a piggyback reservation, if such were desired, and the user would have to send its next SARM in the contentious control flow. In contrast, if the packet size had been 101,000 bytes, the reservation size would have been 527 time slots, for which 184 bytes would be unused in the final time slot . In this case, three cells would be unused in the final time slot so that a piggyback SARM could be sent.

In this example, the average usage of the uplink channel by the sharing set is 320 kb/s among the five users in the sharing set, or 83.3%, far above the usage achievable with slotted Aloha alone. Worst case access time, exclusive of collision effects, for any one user is limited to approximately 16 seconds, as mentioned above. Typical access time is much less, for example, there is a 16.7% probability that no prior reservation exists when an SARM is sent, in which case access to the channel is available within a single round trip time.

The foregoing discussion discloses and describes merely exemplary embodiments of the present invention. One skilled in the art will readily recognize from such discussion, and from the accompanying drawings and claims, that various, changes, modifications and variations can be made therein without departing from the spirit and scope of the invention as defined in the following claims.

What is claimed is:

1. A method for performing a distributed demand assigned multiple access procedure for transmitting data to and from a processing satellite, comprising:

requesting access to a sharing set defined by multiple users using a common transmission resource of a satellite uplink;

connecting to the sharing set by being synchronized to a next available uplink time slot of the transmission resource and being limited to predetermined parameters of the sharing set;

sending a set addressed reservation message on the transmission resource to notify the users of the sharing set of a request to reserve a next available time slot in the transmission resource to send data;

waiting to receive the set addressed reservation message on a satellite downlink; and     sending the data on the reserved next available uplink time slot if the set addressed reservation message is received in the downlink.

2. The method according to claim 1 wherein requesting access to the sharing set includes contacting a network operations center with known data transfer requirements as a potential user of an existing shared set or a new shared set, said network operations center assigning the potential user to the shared set based on the data transfer requirements.

3. The method according to claim 1 wherein being synchronized to the sharing set includes waiting for a set addressed reservation message from an existing member of the sharing set.

4. The method according to claim 1 wherein being synchronized to the sharing set includes waiting a predetermined period of time after being admitted to the sharing set by the network operations center.

5. The method according to claim 1 wherein connecting to the sharing set includes being limited to a predetermined peak cell rate, said peak cell rate being one of the parameters.

6. The method according to claim 1 wherein connecting to the sharing set includes being granted a predetermined sustained cell rate, said sustained cell rate being one of the parameters.

7. The method according to claim 1 wherein connecting to the sharing set includes limiting the length of the data to be sent to a predetermined maximum data length per reservation message.

8. The method according to claim 1 further comprising limiting the number of users of the sharing set.

9. The method according to claim 8 further comprising identifying a worst case delay that a user of the sharing set must wait to send data on the uplink, said worst case delay being identified by a maximum data length multiplied by the maximum number of users minus one then added to a round trip time of the data transmission.

10. The method according to claim 1 wherein sending a set addressed reservation message includes sending the length of the data to be sent on the uplink.

11. The method according to claim 1 further comprising monitoring the downlink by each of the users in the sharing set to look for self-addressed messages from the users in the sharing set.

12. The method according to claim 11 further comprising updating the next available time slot by each user each time a set addressed reservation message is received in the downlink.

13. The method according to claim 1 further comprising attaching a set addressed reservation message to the data sent on the next available uplink time slot.

14. A method of performing a demand assigned multiple access control protocol, comprising:
  contacting a network operations control to be admitted to a sharing set that includes multiple users sharing a common transmission resource;
  synchronizing to the sharing set by identifying a next available uplink time slot available to transmit data on a satellite uplink;
  transmitting a set addressed reservation message to reserve the next available uplink time slot on the transmission resource; and
  transmitting the data on the transmission resource if the self-addressed reservation is received in a satellite downlink.

15. The method according to claim 14 further including monitoring the downlink to receive set addressed reservation message transmitted by other users in the sharing set.

16. The method according to claim 14 wherein the transmission resource is separated into a control flow and a main flow, said control flow being used to transmit the set addressed reservation messages in a contentious manner and said main flow being used to transmit the data in a non-contentious manner.

17. The method according to claim 14 wherein synchronizing to the sharing set includes one of either waiting for a set addressed reservation message from an existing member of the sharing set or waiting a predetermined period of time after being admitted to the sharing set by the network operations control, where the predetermined period of time is based on a maximum reservation delay.

18. The method according to claim 14 wherein being admitted to the sharing set includes being limited to a predetermined peak cell rate, being granted a predetermined sustained cell rate, and being limited to the length of data that can be transmitted per reservation message.

19. The method according to claim 14 further comprising limiting the number of users by the network operation control that can be admitted to the sharing set.

20. The method according to claim 14 further comprising identifying a worst case delay that a user of the sharing set must wait to send data on the uplink, said worst case delay being identified by a maximum data length multiplied by the maximum number of users in the set minus one then added to a round trip time of the data transmission.

21. The method according to claim 14 further comprising updating the next available time slot by each user each time a set addressed reservation message is received in the downlink.

22. The method according to claim 14 further comprising attaching a set addressed reservation message to the data sent on the next available uplink time slot.

23. A method of transmitting data to a satellite on an uplink for communication purposes, comprising:
  separating a transmission resource into a control flow and a main flow, said control flow being used to transmit set addressed reservation messages in a contentious manner among a plurality of users and said main flow being used to transmit the data on the transmission resource in a non-contentious manner;
  synchronizing the plurality of users to a next available uplink time slot;
  maintaining and updating the next available uplink time slot by monitoring set addressed reservation messages in a satellite downlink; and
  reserving time slots in the main flow by transmitting the set addressed reservation messages in the control flow that include the next available uplink time slot.

24. The method according to claim 23 further comprising initially synchronizing the next available uplink time slot by either waiting for a set addressed reservation message or waiting a predetermined period of time based on a maximum reservation delay.

25. The method according to claim 23 wherein a user of the transmission resource is limited to a determined peak cell rate, has been made available a predetermined sustained cell rate, and is limited to the length of data that can be transmitted per reservation message.

26. The method according to claim 23 further comprising identifying a worst case delay that a user must wait to send data on the transmission resource.

27. The method according to claim 23 further comprising attaching a set addressed reservation message to data sent on a reserved available uplink time slot.

* * * * *